March 19, 1946.  F. H. HAGNER  2,397,002
STAR IDENTIFIER AND CELESTIAL CALCULATOR
Filed July 5, 1944  4 Sheets-Sheet 3
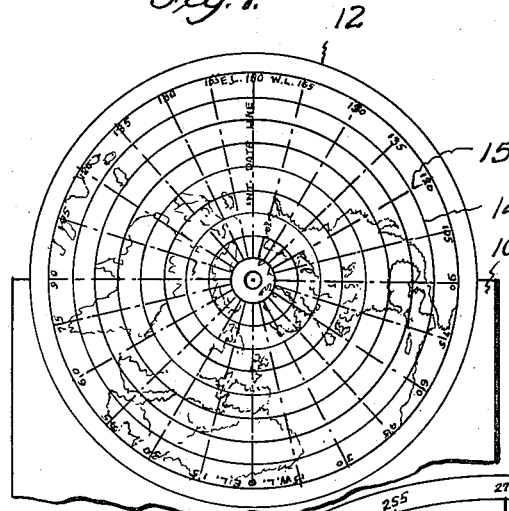
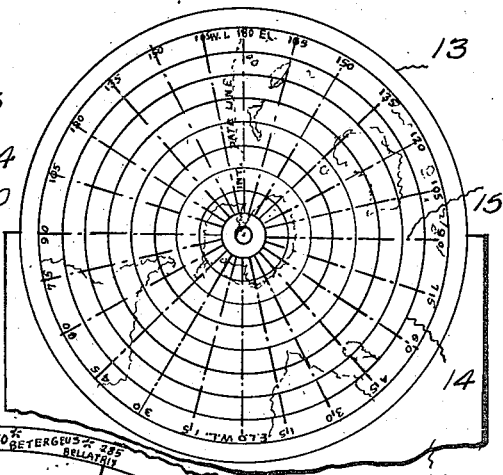
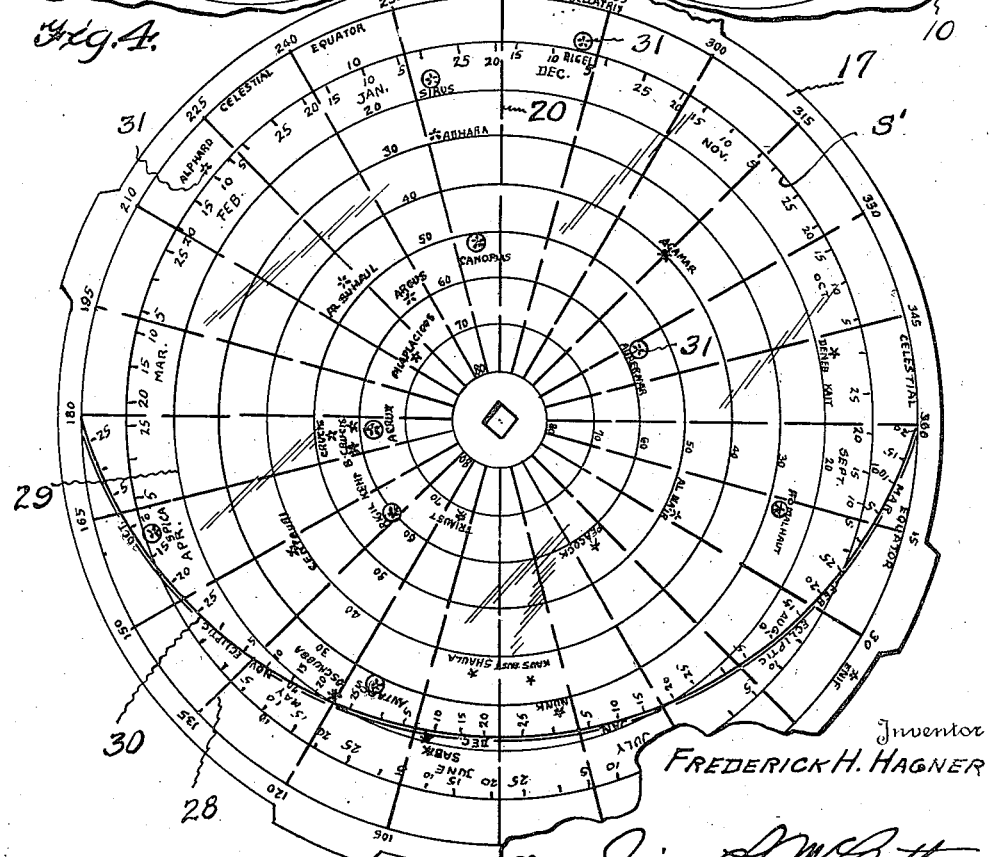
Inventor
FREDERICK H. HAGNER
By Irving R. McCathran
Attorney

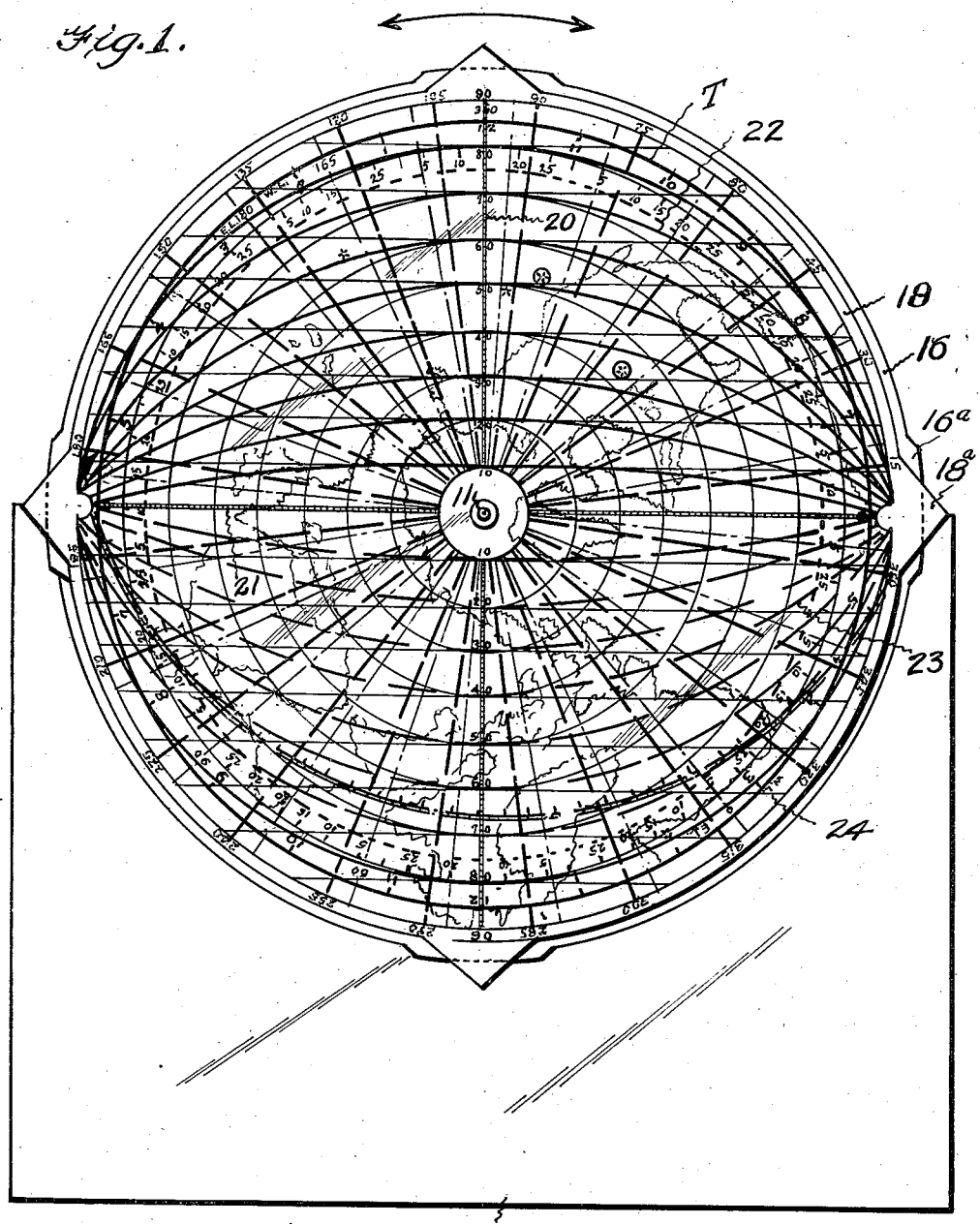

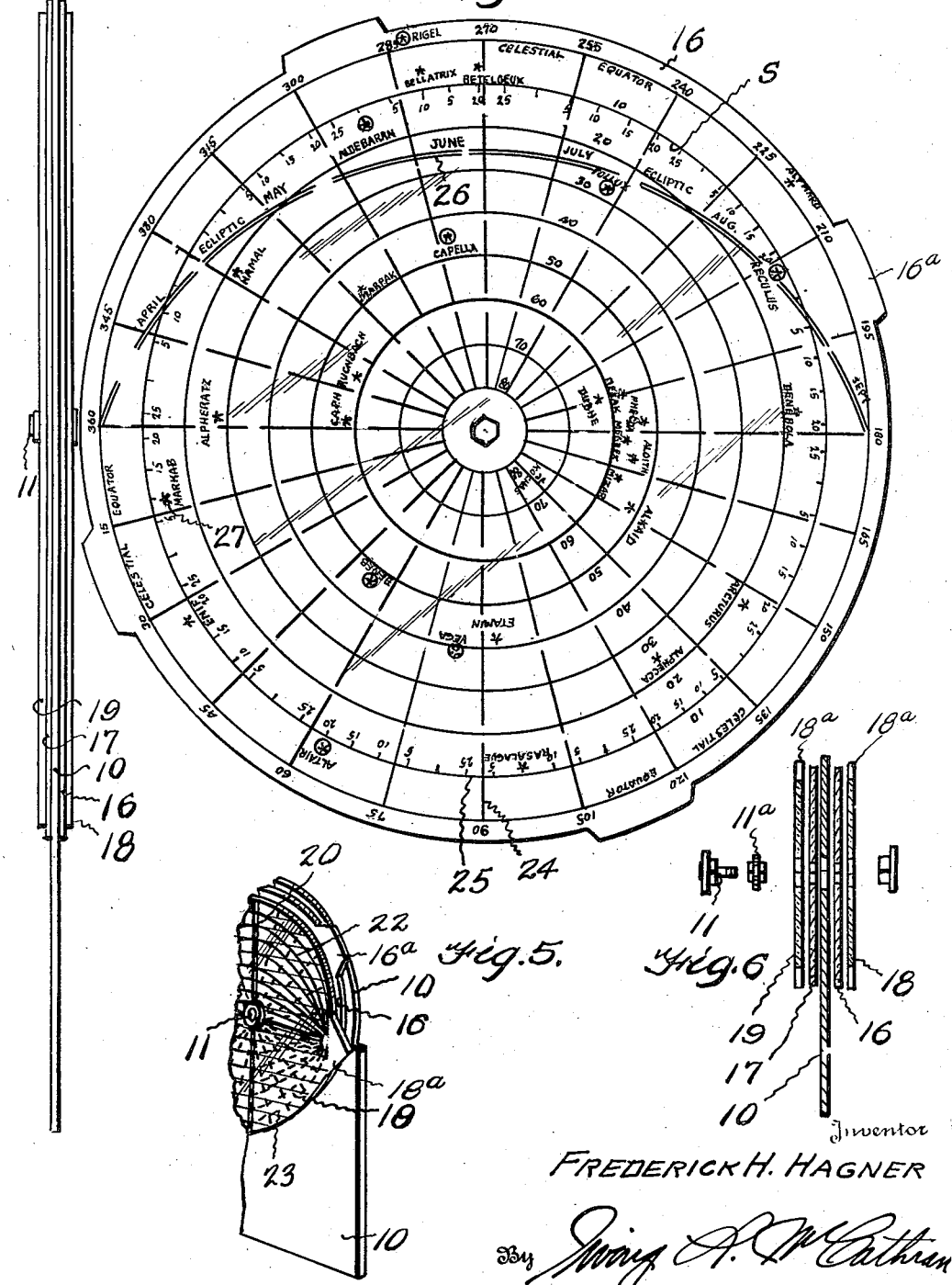

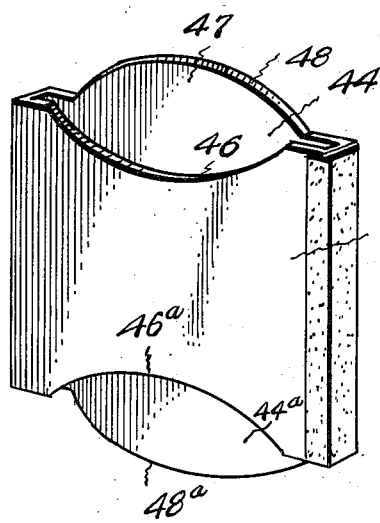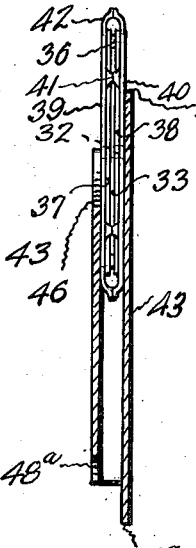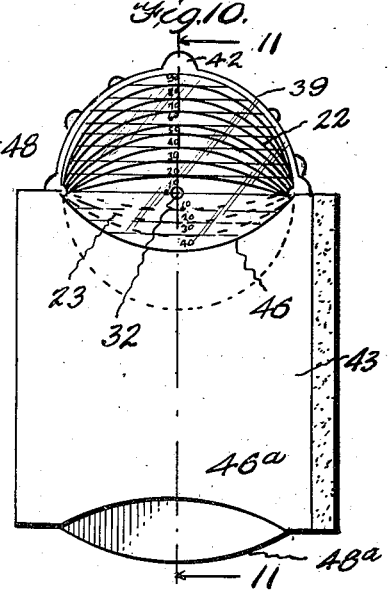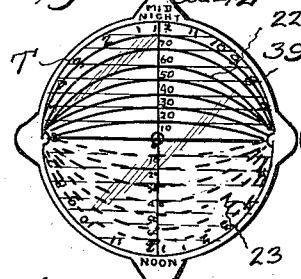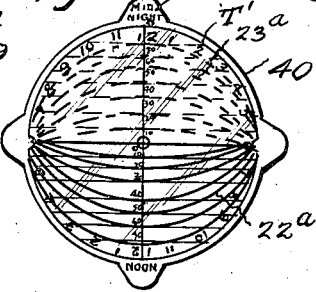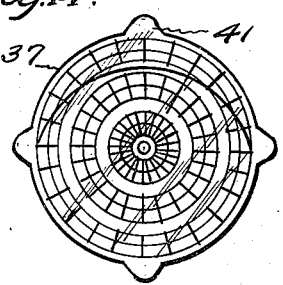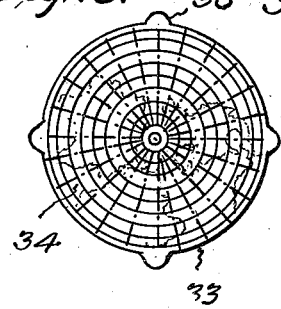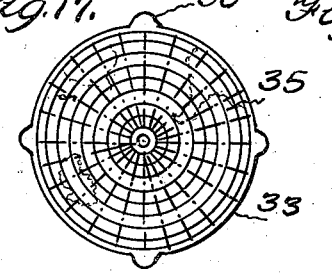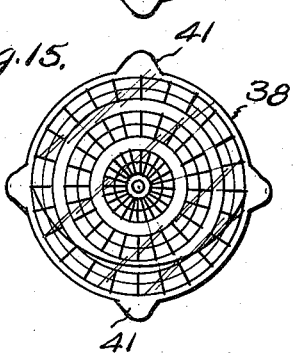

Patented Mar. 19, 1946

2,397,002

UNITED STATES PATENT OFFICE 2,397,002

STAR IDENTIFIER AND CELESTIAL CALCULATOR

Frederick H. Hagner, San Antonio, Tex.

Application July 5, 1944, Serial No. 543,515

4 Claims. (Cl. 35—44)

This invention relates to a star identifier and celestial calculator, and has for one of its objects the production of a simple and efficient chart for visibly displaying an approximate solution of various problems in celestial navigation which arise during a flight or cruise.

Another object of this invention is the production of a chart in the nature of a calculator which acts as a celestial encyclopedia to demonstrate problems in celestial navigation being taught in the classroom, and to illustrate the movement of celestial bodies with reference to the world chart.

Other objects and advantages of this invention will appear throughout the following specification and claims.

In the drawings:

Figure 1 is a front elevational view of one form of the device;

Figure 2 is a side edge elevational view thereof;

Figure 3 is a front view of one of the celestial discs used with reference to the northern hemisphere;

Figure 4 is a front elevational view of the companion celestial disc, used with reference to the southern hemisphere;

Figure 5 is a fragmentary perspective view of the assembled device;

Figure 6 is a vertical central sectional view of the device, the discs and support therefor being drawn apart to illustrate their relative relationship;

Figure 7 is a plan view of the geographical chart showing one side which depicts the northern hemisphere;

Figure 8 is a plan view of the opposite side of the geographic chart upon which is depicted the southern hemisphere;

Figure 9 is a case or holder for use with a modified form of the device;

Figure 10 is a front elevational view of a modified form of the chart mounted in the holder or case;

Figure 11 is a vertical sectional view taken on line 11—11 of Figure 10;

Figure 12 is a plan view of one of the transparent horizon discs used upon the modified form;

Figure 13 is a plan view of the companion transparent horizon disc;

Figure 14 is a plan view of one of the transparent celestial discs used with the modified form used for the northern hemisphere;

Figure 15 is a plan view of the companion transparent celestial disc used for the southern hemisphere;

Figure 16 is a plan view of one side of the geographic disc illustrating the northern hemisphere; and Figure 17 is a plan view of the reverse side of the geographic disc illustrating the southern hemisphere.

By referring to the drawings, it will be seen that 10 designates a supporting panel which carries a central transverse journal pin 11. A geographical chart 12 is formed upon one side of the panel 10 near its upper end depicting the northern hemisphere and a chart 13 is formed upon the opposite side of the panel 10 depicting the southern hemisphere. Each chart 12 and 13 has formed thereon concentric circular latitude lines 14, and radiating longitude lines 15 extending from the poles of the equator, as shown in Figures 7 and 8.

A transparent celestial chart preferably in the nature of a circular disc is journaled upon the journal pin 11 upon each side of the panel 10, as shown. One transparent celestial chart 16 or disc, shown in detail in Figure 3, is superimposed over the geographical chart 12 depicting the northern hemisphere and has shown thereon navigational stars observable from the northern hemisphere as well as other data described in the following. The other transparent celestial chart or disc shown in detail in Figure 4 is superimposed over the reverse chart 13 which depicts the southern hemisphere and this chart 17 has shown thereon navigation stars observable from the southern hemisphere. Other information described as follows and shown in detail in Figure 4, is contained upon this disc.

An outer horizon transparent disc 18 is carried by the journal pin 11 upon one side of the panel 10 and is superimposed over the disc or chart 16, and an other outer horizon transparent disc 19 is journaled upon the pin 11 and is superimposed over the disc or chart 17 upon the opposite side of the panel 10 relative to the disc 16. Each disc 18 and 19 is provided with a central vertical line 20 indicating an observer's meridian line and a central transverse line 21 indicating the equator. Upwardly curved lines 22, spaced ten degrees apart and extending transversely of the disc 19, are arranged above the equator line 21 and are preferably colored blue indicating horizon lines. Similar lines preferably colored red 23, or of a some other contrasting character or color are arranged below the equator line 21. Straight lines 24 are extended transversely across the face of the disc 18 from the bottom toward the top at ten degree intervals to designate altitude and to facilitate measurement of altitude. The disc 19 is similarly marked, except that the lines similar to the lines 22 above the equator are preferably colored red and the lines similar to the lines 23 below the equator are preferably colored blue, so that the color scheme of the lines will appear in staggered relation upon opposite sides of the calculator above and below the equator line, in the same manner as shown in the modified form—note Figures 12 and 13. A local time clock T is carried near the edge of the horizon disc 18 and a local time clock T' is carried near the edge of the horizon disc 19, see Figure 1 and in detail Figures 12 and 13.

The transparent celestial disc 16 is provided with the conventional radiating sidereal hour angle lines 24 and the conventional declination lines 25. The ecliptic line 26 is also shown thereon depicting the path of the sun in north declination as indicated in Figure 3. The navigational stars 27 visible from the northern hemisphere are also depicted in their proper relationship upon the transparent celestial disc 16 and this disc 16 is superimposed over the geographic disc 12 depicting the northern hemisphere. A star calendar S is carried by the celestial chart 16.

The transparent celestial disc 17 is located upon the opposite side of the device and is superimposed upon the geographic chart 13 located upon the reverse side of the chart 12. This chart 13 depicts the southern hemisphere. The transparent celestial disc 17 is provided with radiating sidereal hour angle lines 2 and declination lines 29. The ecliptic line 30 is also shown thereon depicting the path of the sun, in south declination. Navigational stars 31 observable from a position on the southern hemisphere are also depicted in their proper relationship upon the transparent celestial disc 17—see Figure 4. A star calendar S' is carried by the celestial chart 17.

It is optional when assembling the device whether the horizon discs 18 and 19 are placed over the celestial discs 16 and 17, or vice versa, in view of the fact that these discs 16, 17, 18 and 19 are all transparent and are adapted to be placed in superimposed relationship, that is to say one celestial and one companion horizon disc is placed in superimposed relation upon the companion geographic chart on one side of the calculator. The other celestial chart and its companion horizon disc are superimposed upon the opposite geographic chart upon the opposite side of the calculator. One arrangement is illustrated in Figure 6.

If desired, the calculator may be formed of five discs shown in Figures 10 to 17 inclusive, all rotatably mounted upon a suitable journal 32. A geographic disc 33 has a chart 34 of the northern hemisphere appearing thereon upon one side, and a chart 35 of the southern hemisphere appearing thereon upon the opposite side thereof, as shown in Figures 16 and 17. Finger tabs 36 extend from the edge of the disc 33 to facilitate the rotation of the disc upon the journal 32. A transparent celestial disc 37 is superimposed upon the chart 34 and the transparent celestial disc 38 is superimposed upon the chart 35. The disc 37 and chart 34 have a transparent horizon disc 39 superimposed thereon, and a transparent horizon disc 40 is superimposed upon the disc 37 and chart 38 upon the opposite side of the disc 33.

The relative superimposed position of the celestial and horizon charts may be reversed whereby the celestial charts are outside and the horizon charts are placed between the celestial charts and the geographic charts if desired, without departing from the spirit of the invention. These celestial and horizon charts are transparent and the purpose of the invention is to permit the indicia upon the geographic charts, the celestial and the horizon charts, to be visible to the eye of an observer so that the position of the navigation stars may be seen relative to the selected position upon the geographic chart at a selected time of the day and at a selected time of the year. This instrument demonstrates to the eye of a student or navigator the relative position of a selected observed celestial body to a selected position at a given time upon the geographic chart, or the earth's surface. This is possible due to the superimposed position of the transparent celestial and horizon charts which are rotatably mounted thereon with respect to the geographic charts on opposite sides of the disc 33. Finger tabs 41 are provided at the edge of the discs 37 and 38 and are connected at their extremities to tie the discs 37 and 38 together and so that the tabs 36 will pass therebetween as the discs 37 and 38 are rotated to a selected position about the geographic chart disc 33.

The horizon discs 39 and 40 are provided with similar finger tabs 42 which are secured together at their extremities in a manner to tie the opposite discs 39 and 40 together and also to permit the tabs of the adjoining discs to pass therebetween when the discs are rotated relative to one another. Any suitable means may be employed to secure the opposite discs together without departing from the spirit of the invention.

As shown in Figures 9 to 11, a case 43 is provided having open ends 44 and 44ª. The front wall 45 is curved inwardly, as at 46, along its upper edge to provide a guiding edge to represent observer's horizon, and the upper edge 48 of the rear wall 47 is curved upwardly to provide a guiding edge for the opposite side when viewing the celestial disc for the south declination. The assembled discs 33, 37, 38, 39 and 40 constituting the calculator, are placed within the upper open end of the case 43 so that selected horizon lines 22 and 23 may be selectively brought into, at least approximate registration with the edges 46 and 48 upon opposite sides of the device to facilitate the location of these horizon lines to the eye of the observer.

The case 43 is provided on its front wall with the inwardly curved edge 46ª and outwardly curved edge 48ª, the edges 46ª and 48ª preferably being of a different arc from the edges 46 and 48. It should be understood that the horizon charts or discs 39 and 40 are marked similarly to the horizon discs 18 and 19.

The horizon discs may be dispensed with if desired when using the case 43, and the edges 46, 48, 46ª and 48ª may be used to designate the horizon lines.

The geographic charts 12 and 13, as well as the celestial charts 16 and 17 as illustrated, are azimuthal equidistant projections, but a polar projection geographic chart and polar celestial chart may be used without departing from the spirit of the invention.

The celestial discs 16 and 17 may be keyed together on a rotating journal 11ª and the journal pin 11 may be rotatably mounted through the journal 11ª, and this pin 11 may be locked in engagement with the horizon discs 18 and 19, thereby tying the horizon discs 18 and 19 together so that they may rotate in unison. The discs 16 and 17 are locked upon the journal 11ª so that they may be rotated together freely upon the panel 10. Finger tabs 18ª protrude from the edges of the horizon discs 18 and 19 to facilitate the rotation of these discs, and finger tabs 16ª protrude from the edges of the discs 16 and 17. As previously described, the discs 18 and 19 may be tied together by securing the tabs together or by tying them together through a central journal. The celestial discs 16 and 17 may be tied together by joining the tabs as shown in Figure 11, or they may be locked together by means of a journal 11ª above described.

The horizon lines on the horizon discs 18 and 19 are arranged in the manner as illustrated in the form shown in Figures 12 and 13, and the time clocks on these horizon discs T and T' are similarly arranged to that as shown in Figures 12 and 13.

Example of operation:

Take celestial chart in one hand (north declination), face north, place center pole in line with north star. Next rotate chart until the Big Dipper star designation on the chart matches with Big Dipper in the sky, then all other stars will be matched over the respective navigation stars in the heavens which are designated by location and name upon the chart. The radiating hour angle lines are indicating means to assist observer in pointing to and locating selected stars. The chart is then oriented as the heavens are seen from that location at that particular time and date. Now place celestial chart over geographical chart so that the zenith point (the point overhead) in the heavens is superimposed over the geographic location of the observer; for instance, Washington, D. C., on the geographic chart will appear approximately under the navigational star Vega at approximately July 1 at 12 o'clock midnight. The meridian line on the horizon chart intersects or overlies this star and Washington's location.

Since the North Star is about 40° above the horizon at Washington, and on that time and date Vega is on the observer's meridian, Vega's declination being approximately the same declination as the latitude of Washington, the altitude of Vega at that time would be 90° and at its zenith position in the heavens. The time, date and month are indicated with this setting. The calendar on the celestial chart and the time clock on the horizon chart which carries the observer's meridian line are brought into registration by rotating the celestial chart upon the geographical chart and horizon charts to indicate July 1 at 12 o'clock midnight. The date and time is matched by the observer's meridian line on the horizon chart intersecting the hour 12 midnight and the date July 1.

Having described the invention, what is claimed as new is:

1. In combination with a star identifier and celestial calculator having horizon lines formed thereon, a case for receiving said calculator, and said case having a sighting edge adapted to be brought into approximate registration with the horizon lines formed on the calculator to assist an observer in readily locating the selected horizon line on said calculator.

2. In combination with a star identifier and celestial calculator having horizon lines formed thereon, a case for receiving said calculator, said case having sighting edges adapted to be brought into approximate registration with the horizon lines formed on the calculator to assist an observer in readily locating the selected horizon line on said calculator, said calculator having horizon lines on opposite sides thereof, the calculator having an equator line, one sighting edge being curved upwardly for matching the horizon lines above the equator line on one side of the calculator, and the other sighting edge being curved downwardly for matching the horizon lines below the equator on the opposite side of the calculator.

3. In combination with a star identifier and celestial calculator having horizon lines formed thereon, and a sighting gauge fitting over the calculator and selectively registering with the horizon lines for clearly indicating the selected horizon line to an observer.

4. In combination with a terrestrial and transparent celestial chart mounted in superimposed relation, an altitude indicating means, and a guide movable over the said charts to indicate the position of the observer's horizon for a given latitude relative to said charts.

FREDERICK H. HAGNER.